May 13, 1924.
C. M. PAGE
ELECTRICALLY HEATED OIL CRACKING APPARATUS
Filed March 22, 1922
1,494,125
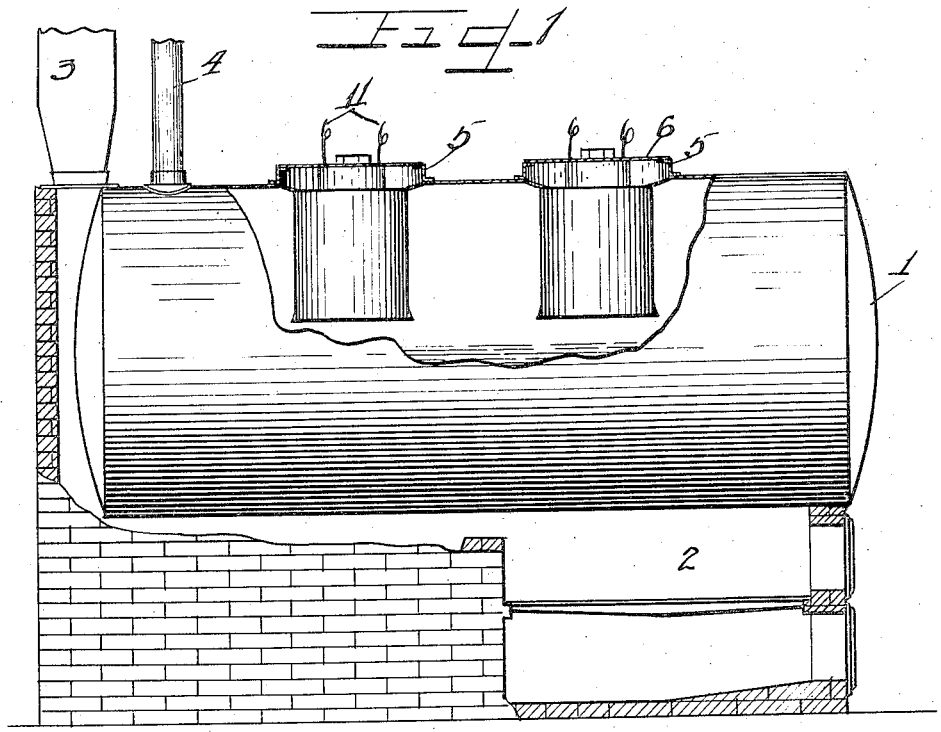
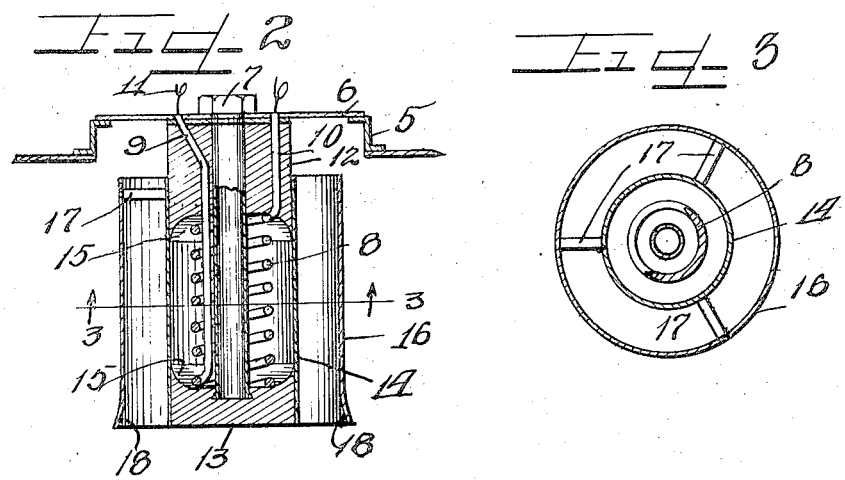

Patented May 13, 1924.

1,494,125

UNITED STATES PATENT OFFICE.

CARL M. PAGE, OF GENEVA, ILLINOIS, ASSIGNOR TO GEORGE FABYAN, OF GENEVA, ILLINOIS.

ELECTRICALLY-HEATED OIL-CRACKING APPARATUS.

Application filed March 22, 1922. Serial No. 545,765.

*To all whom it may concern:*

Be it known that I, CARL M. PAGE, a citizen of the United States, and a resident of Geneva, in the county of Kane and State of Illinois, have invented certain new and useful Improvements in an Electrically-Heated Oil-Cracking Apparatus; and I do hereby declare that the following is a full, clear, and exact description of the same, reference being had to the accompanying drawings, and to the numerals of reference marked thereon, which form a part of this specification.

It is an object of this invention to provide an electric auxiliary heater for raising the vapors in an oil still from a temperature slightly below the cracking point to a temperature at which they will crack.

It is a further object of this invention to lead the oil vapors past a surface heated by the electric heater and to make such surface of a catalytic material.

It is a further object of this invention to provide a passage for the oil vapors so that they shall be gradually heated to the cracking point and as gradually cooled to the temperature of the still.

Other and further important objects of the invention will be apparent from the disclosures in the accompanying drawings and specification.

The invention (in a preferred form) is illustrated in the accompanying drawings and hereinafter more fully described.

On the drawings:

Figure 1 is a view partly in section of a still to which my invention has been applied.

Figure 2 is a central section through an auxiliary heater.

Figure 3 is a section upon the line 3—3 of Figure 2.

As shown on the drawings:

The still includes a boiler-shaped receptacle 1 heated by a furnace 2 which has a stack 3. The still has the usual outlet 4 leading to the condenser. It is supplied with domes or caps 5, one for each of the auxiliary heating devices. Preferably the top of each dome is closed by a plate 6 through which goes a bolt 7 for supporting the auxiliary heating device.

The heating device is an electric coil 8 and to bring the current to this coil, leads 9 and 10 are prepared through which comes the current from the external wires 11. The leads go through a block of insulation 12, preferably of fire clay or other substance that will withstand the temperatures of the still and also serve as a non-conductor for the heat. At the lower end of the bolt is secured another piece 13 of heat insulating material.

The two bodies of insulating material are connected by a cylindrical tube 14 and their adjacent surfaces are bowl-shaped as shown at 15 in order that the heat may be reflected toward the central part of this tube. The tube 14 is of some substance such as iron, which will serve as a conductor of heat, and also have a catalytic action upon the oil vapors. The substance is changed according to the effect upon the oil vapors desired. Thus, it may be iron, or iron coated with some such substance as aluminum oxide or platinum black, or other catalytic agent; or the tube may itself be made entirely of aluminum, or copper, or some other metal which has a catalytic effect upon oil vapors.

The tube 14 is surrounded by a tube 16, and the two are spaced apart by radial supports 17 which act to hold the two cylinders in concentric relation and also to support the cylinder 16. The lower end of the cylinder 16 is flared, as shown at 18.

The operation is as follows:

In the operation of the device, the still 1 is heated by the furnace 2 until the vapors which arise from the oil reach nearly the cracking temperature. During the first part of this heating operation vapors suitable for gasoline will pass off through the outlet 4. The upper part of the still will become filled with vapors whose temperature will gradually rise as the distillation continues. When the cracking point has nearly been reached, the current through the wires 11 will be turned on and, passing down the lead 9, and through the coil 8 and out by the lead 10, will heat this coil.

The heat thus generated is reflected by the surfaces 15 so that the greater part of it strikes the cylinder 14 near the center of the part surrounding the coil. The heat from the cylinder 14 heats the passage between this cylinder and 16 and causes a convection current of oil vapor which enters at the flared end 18 and emerges into the dome 5. Because of the concentrated heating effect due to the reflecting surfaces 15, the vapor passing through the passage between the two cylinders will be heated most strongly at about the middle of this passage. Thus the vapors will enter the passage at a temperature slightly below that for cracking, will reach this temperature at about the middle of the passage and will cool as they go through the upper part of the passage. During the very top of this passage the vapors receive no heat from the coils 8 because they are beyond the lower end of the insulating body 12. Thus when they emerge at the top of the passage they are nearly at the same temperature as when they enter, the difference being only sufficient to maintain the convection current. Since the cracking itself has an effect upon the specific gravity of the vapors, the heating need be less than would be otherwise required. The vapors which emerge at the top of the passage are suitable for making gasoline and they pass out of the outlet 4 in the same way as ordinary gasoline vapors.

I am aware that numerous details of construction may be varied through a wide range without departing from the principles of this invention, and I therefore do not purpose limiting the patent granted otherwise than necessitated by the prior art.

I claim as my invention:

1. An oil still, a main heater therefor, supplemental heaters supported in the vapor space of the still and each including a pair of concentric cylinders, an electrical heating device within the inner cylinder, and means for locating the heat from said device near the middle of the passage between said two cylinders.

2. An oil still, a main heater therefor, supplemental heaters supported in the vapor space of the still and each including a pair of concentric cylinders, an electrical heating device within the inner cylinder, means for locating the heat from said device near the middle of the passage between said two cylinders, a flared opening at the lower end of said passage, and a vapor dome in the upper wall of the still adjacent the upper end of said passage.

3. In a device of the class described, a heating coil, a metal cylinder surrounding said coil, plugs of heat insulating material closing each end of said cylinder, the facing surfaces of said plugs being formed to reflect said heat toward the middle of said cylinder.

4. In a device of the class described, a heating coil, a metal cylinder surrounding said coil, plugs of heat insulating material closing each end of said cylinder, the facing surfaces of said plugs being formed to reflect said heat toward the middle of said cylinder, the exterior surface of said cylinder being formed of a substance capable of acting catalytically upon oil vapors.

5. In an oil still, a main heater, supplemental electrical heating means supported in the vapor space of the still, a passage adjacent said heating means, and means for locating the heat from said electrical heating means near the middle of said passage.

6. In an oil still, a main heater, a vertically passaged member in the vapor space of said still, both ends of the passage being in communication with said vapor space whereby the vapors in such space may circulate through the passage and means for heating a wall of said passage.

7. In an oil still, a main heater, a vertically passaged member in the vapor space of said still, both ends of the passage being in communication with said vapor space whereby the vapors in such space may circulate through the passage and electrical means for raising the temperature at the middle of the passage in said member above the temperature of the still.

In testimony whereof I have hereunto subscribed my name in the presence of two subscribing witnesses.

CARL M. PAGE.

Witnesses:
A. R. Dow,
Wm. C. Wood.